United States Patent [19]

Forsland

[11] 4,146,475
[45] Mar. 27, 1979

[54] ELECTREFINER

[76] Inventor: Audre C. Forsland, 300 Liberty St., NE., Minneapolis, Minn. 55432

[21] Appl. No.: 856,521

[22] Filed: Dec. 1, 1977

[51] Int. Cl.² .............................................. B01D 35/18
[52] U.S. Cl. ..................................... 210/71; 210/180; 210/181; 210/184; 210/295; 210/342; 210/444; 210/DIG. 17
[58] Field of Search .................... 210/70, 71, 180–184, 210/295, 342, 440–444, DIG. 17

[56] References Cited

U.S. PATENT DOCUMENTS

| | | | |
|---|---|---|---|
| 2,839,196 | 6/1958 | Schwalge | 210/180 |
| 3,167,507 | 1/1965 | Burhans et al. | 210/440 X |
| 3,616,885 | 11/1971 | Priest | 210/184 X |
| 3,756,412 | 9/1973 | Barrow | 210/180 |
| 3,915,860 | 10/1975 | Priest | 210/180 X |
| 4,006,084 | 2/1977 | Priest | 210/180 |

*Primary Examiner*—William A. Cuchlinski, Jr.
*Attorney, Agent, or Firm*—S. Pal Asija

[57] ABSTRACT

An electric oil refining apparatus for motor vehicle internal combustion engines designed to remove liquid and solid contaminants from oil which is then recycled. The oil exits from a single small orifice into a vaporization chamber where, due to sudden change of temperature and pressure, the liquid contaminants separate from the oil. The stream of oil is then deflected against a heated concave cup which vaporizes liquid contaminants, and allows oil to flow over the floor of the vaporization chamber and back to the internal combustion engine of the motor vehicle for reuse. A filter is provided at the input to the orifice, thereby avoiding clogging of the orifice.

4 Claims, 2 Drawing Figures

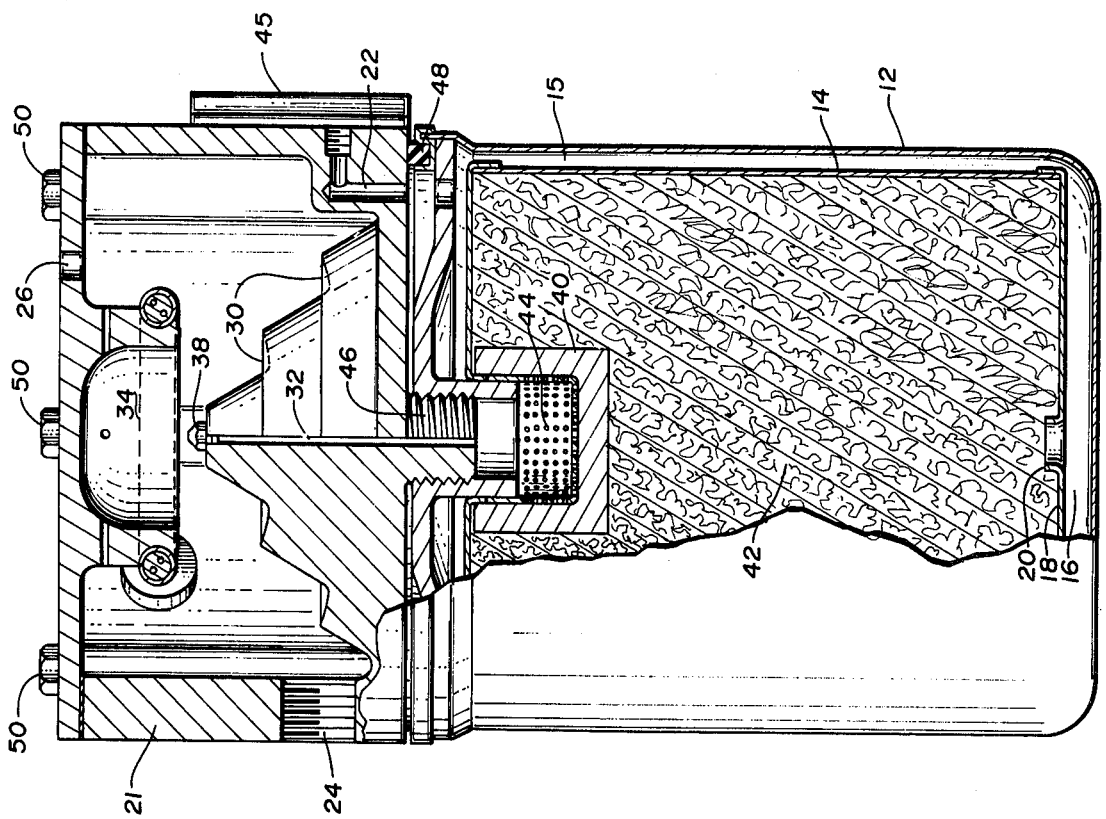
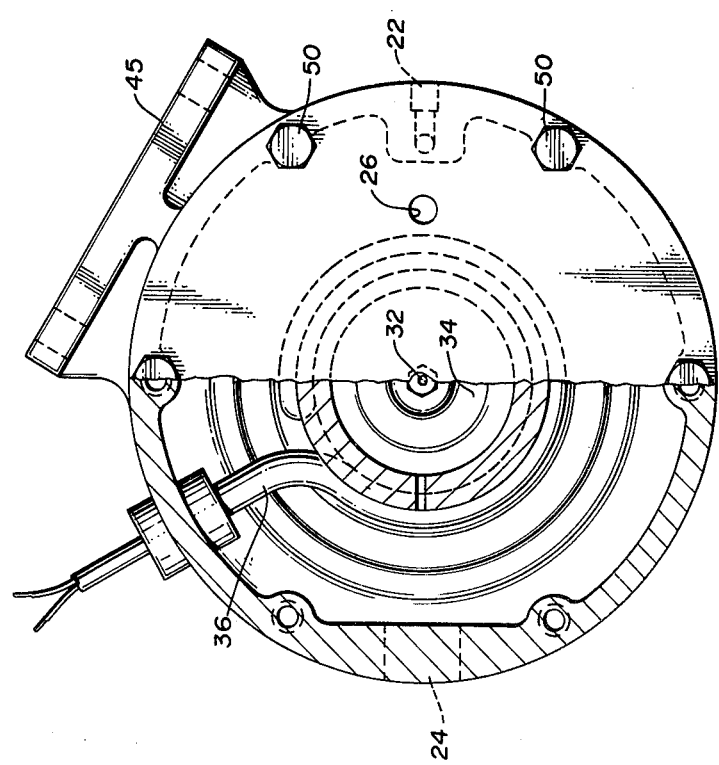

ELECTREFINER

SUMMARY

This section delineates the need, the prior art and the objectives of the present invention. The lubrication oil of motor vehicle internal combustion engines requires constant purification to avoid any damage to the engine. The applicant's invention is an improvement over the prior art devices such as Schwalge U.S. Pat. Nos. 2,635,759; 2,785,109 and 2,839,196 or Barrow U.S. Pat. No. 3,550,781 or Priest U.S. Pat. No. 3,616,885.

None of the prior art devices utilize the principle of sudden drop in pressure in the vaporization chamber to separate the liquid contaminants from the oil. This is accomplished in the applicant's invention by utilizing a single orifice connected to a chamber of oil under pressure via a capillary.

It is an object of this invention to provide an efficient means of recycling lubricating oil for use in internal combustion engines.

Another object of this invention is that it is designed so that the device need not be in a vertical position with respect to the ground or the motor vehicle, as with the prior art devices.

Another object of this invention is to separate the solid contaminants from the oil before separating the liquid contaminants such as water. This also avoids clogging of the orifice.

Another object of this invention is to separate liquid contaminants from oil by sudden change in temperature and/or pressure.

BRIEF DESCRIPTION OF THE DRAWING

The drawing accompanying this application contains two figures as follows;

FIG. 1 is a cross-sectional exploded side view of the electric oil refiner of this invention.

FIG. 2 is top view of the oil recycling apparatus of this invention.

DETAILED DESCRIPTION OF THE PREFERRED EMBODIMENT

The electric oil refiner of this invention is a system for purifying and recycling oil for use in conjunction with internal combustion engines on motor vehicles and stationary engines. As shown in FIG. 1, the preferred embodiment comprises a concentric cylinder housing having an outer cylinder 12, and an inner cylinder 14. One end of said concentric cylinders 12 & 14 is closed generally at the bottom 16 & 18 respectively, such that the space 15 between said two cylinders 12 & 14 can hold liquids. The inner cylinder 14 has a hole 20, or multiple holes in its bottom side 18. A vaporization chamber 21 having an oil inlet 22, an oil outlet 24 and a vapor exit 26 fastens to said concentric cylinder housing. Furthermore said vaporization unit 21, comprises a plurality of concentric staircase platforms 30, mounted around a thin capillary pipe 32 and a concave cup 34 heated by an electrical unit 36. The thin capillary pipe 32 extends between said vaporization unit 21 and said cylinder housing. Similarly oil inlet 22 connects to space 15 between concentric cylinder housing.

The thin capillary pipe 32 terminates into a small orifice 38 in the vaporization unit 21. The concentric cylinder housing 12, 14 also includes a fine filter 40 inside a coarse filter 42. The fine filter 40 surrounds a perforated basket 44, which in turn surrounds the thin capillary pipe 32 connecting concentric cylinder housing 10 to the vaporization chamber 21.

As shown in FIG. 2 which is a top view of the electric oil refiner of this invention, a mounting bracket 45 is provided to facilitate mounting of the oil refining apparatus of this invention in the engine compartment of the motor vehicle or stationary engine. The oil inlet 22 and oil outlet 24 are connected in the path of the lubricating oil. For ease of replacement of filters 40 and 42, vaporization chamber 21 can be separated from concentric cylinder housing merely by unscrewing concentric cylinder housing. In addition a gasket 48 is used to make the junction between the two units to wit vaporization chamber 21 and concentric cylinder housing completely oil tight so that oil can be maintained under pressure in space 15 enclosed by said concentric outer and inner cylinders 12 & 14 respectively.

Many variations of this device may be made without deviating from the spirit of this invention. For example the drawing for the preferred embodiment shows a partial length perforated basket 44, however a full length perforated basket may be utilized instead. Variations can also be made in the heating element 36 which may be 12 & 24 volt direct current or 110 or 210 volts alternating current where such electrical energy is available in the vicinity of the engine using lubricating oil along with this invention. Likewise hole 20 may be a plurality of holes.

Following is a listing of the components used in the preferred embodiment arranged in ascending order of reference numerals along with their typical values and trade names where applicable.

12 Outer cylinder
14 Inner cylinder
15 Space between cylinders
16 Bottom of outer cylinder
18 Bottom of inner cylinder
20 Hole in the bottom of inner cylinder
21 Vaporization chamber
22 Oil inlet
24 Oil outlet
26 Vapor exit
30 Concentric staircase platforms
32 Thin capillary pipe
34 Concave cup
36 Heating unit
38 Orifice
40 Fine filter such as a felt pad
42 Coarse filter such as cotton or wood fiber
44 Perforated basket
45 Mounting bracket
46 Fastener (threaded portion)
48 Gasket
50 Fastening screws (outer)

OPERATION

The impure oil containing such impurities as dirt, water, Sulphuric Acid ($H_2SO_4$) and the like enters via oil inlet 22 into space 15 between a pair of concentric cylinders 12, 14. Because of the pressure maintained by the oil pump of the internal combustion engine, the oil finds its way upward against gravity through the hole 20, coarse filter 42, finer filter 40, perforated basket 40 and the capillary tube 32 and via orifice 38 into the vaporization chamber 21. In view of the pressure and the fact that there is no other exit for the oil, it escapes through the orifice with high velocity. It should be noted that solid impurities such as dust particles have been captured by the coarse and fine filters respectively. In view of the fact that oil and liquid contaminants have different densities, the two become separated as they undergo pressure change and traverse space at atmospheric pressure. Under high pressure the liquids from the orifice strike the concave heated surface of the cup 34, where liquid contaminants such as water and sulphuric acid evaporate and escape via exit 26 in the form of vapors into the atmosphere and thereby leaving behind the oil a little bit more pure in successive iterations. When the water and other liquid contaminants are separated from the oil, through a sudden release of pressure, and through striking the concave cup, these contaminants form as droplets on the surface of the top much as droplets will form on the top of a teakettle. Then because the top of the refiner is hot, these droplets are vaporized and pass off into the atmosphere through vapor exit (26).

The oil striking the concave cup serves to further break down the bond between the oil and its liquid contaminants, a process that is started as the oil breaks out of the orifice at high pressure into the vaporization chamber which is at atmospheric pressure. The oil, after striking the concave cup 34 falls down on the concentric platforms 30 due to the force of the gravity. The top surfaces of said concentric platforms are designed somewhat of concave shape so as to facilitate trickling down of oil and thereby allow the oil a longer time in the vaporization chamber. Finally the oil exits via the oil outlet 24 to the crank case for reuse as lubricant. This is a continuous operational process, which removes some of the solid and liquid contaminants in each successive iteration. After a while it becomes necessary to replace coarse and fine filters 42 and 40 respectively. The process allows a greater time and/or mileage internal between oil changes and insures continuous removal of liquid as well as solid contaminants.

The applicant claims:

1. A system of purifying and recycling lubricating oil for internal combustion engines comprising:
   (a) a sealed housing having an oil inlet;
   (b) a coarse filter mounted inside said sealed housing;
   (c) a fine filter mounted inside said coarse filter;
   (d) a hollow perforated basket mounted inside said fine filter;
   (e) a thin capillary tube mounted inside said hollow perforated basket;
   (f) plurality of concentric platforms mounted around said thin capillary tube above said sealed housing;
   (g) a concave cup mounted above said thin capillary tube where the concave shape of said concave cup faces said orifice of said thin capillary tube;
   (h) heating means for heating top of unit and said concave cup;
   (i) housing means for enclosing said plurality of concentric platforms and said concave cup;
   (j) exit means for exit of gaseous substances connected to said housing means at a high joint; and
   (k) an oil outlet for exit of purified oil, which is connected to said housing means at a low point.

2. An electric oil refining system of purifying and recycling lubricating oil for internal combustion engines of claim 1, wherein said perforated basket extends along the entire axis of said sealed housing and wherin said sealed housing is made of a pair of concentric cylinders.

3. An electric oil refiner as a system of purifying and recycling lubricating oil for internal combustion engines of claim 1 wherein said plurality of concentric platforms have a concave shape.

4. A process of purifying and recycling lubricating oil for internal combustion engines comprising the steps of:
   (a) capturing dirty oil from crank case of said internal combustion engine;
   (b) passing said dirty oil through a coarse filter;
   (c) passing said dirty oil through a fine filter;
   (d) passing the oil through a perforated basket;
   (e) passing the oil through a thin capillary tube;
   (f) releasing said oil through said thin capillary tube via a single orifice into atmospheric pressure;
   (g) heating said oil;
   (h) letting said oil fall by gravity;
   (i) evaporating and letting escape liquid impurities of said oil; and
   (j) passing cleaned oil back to the crank case of said internal combustion engine.

* * * * *